United States Patent
Wang

(10) Patent No.: US 9,262,337 B2
(45) Date of Patent: Feb. 16, 2016

(54) DYNAMICALLY DETERMINING A TRANSLATION LOOKASIDE BUFFER FLUSH PROMOTION THRESHOLD VALUE

(71) Applicant: Microsoft Technology Licensing, LLC, Redmond, WA (US)

(72) Inventor: Landy Wang, Honolulu, HI (US)

(73) Assignee: Microsoft Technology Licensing, LLC, Redmond, WA (US)

(*) Notice: Subject to any disclaimer, the term of this patent is extended or adjusted under 35 U.S.C. 154(b) by 149 days.

(21) Appl. No.: 14/050,153

(22) Filed: Oct. 9, 2013

(65) Prior Publication Data

US 2015/0100738 A1    Apr. 9, 2015

(51) Int. Cl.
*G06F 12/10*    (2006.01)
*G06F 11/00*    (2006.01)
*G06F 12/08*    (2006.01)

(52) U.S. Cl.
CPC ............ *G06F 12/1027* (2013.01); *G06F 11/00* (2013.01); *G06F 12/0891* (2013.01); *G06F 12/1063* (2013.01)

(58) Field of Classification Search
CPC ............ G06F 12/1063; G06F 12/0891; G06F 12/1027; G06F 11/00
USPC .................................................. 711/135, 134
See application file for complete search history.

(56) References Cited

U.S. PATENT DOCUMENTS

| | | | |
|---|---|---|---|
| 4,525,778 A * | 6/1985 | Cane ............................. 711/207 |
| 5,809,522 A * | 9/1998 | Novak et al. .................. 711/135 |
| 6,678,794 B1 | 1/2004 | Talyansky et al. |
| 7,069,389 B2 * | 6/2006 | Cohen .......................... 711/135 |
| 8,095,771 B2 * | 1/2012 | Sheu .................... G06F 12/1036 711/203 |
| 2012/0047332 A1 | 2/2012 | Bannon et al. |
| 2013/0007406 A1 | 1/2013 | Sheaffer et al. |
| 2013/0019080 A1 | 1/2013 | Levinsky et al. |

* cited by examiner

*Primary Examiner* — Pierre-Michel Bataille
(74) *Attorney, Agent, or Firm* — John Jardine; Kate Drakos; Micky Minhas

(57) ABSTRACT

A translation lookaside buffer (TLB) of a computing device is a cache of virtual to physical memory address translations. A TLB flush promotion threshold value indicates when all entries of the TLB are to be flushed rather than individual entries of the TLB. The TLB flush promotion threshold value is determined dynamically by the computing device by determining an amount of time it takes to flush and repopulate all entries of the TLB. A determination is then made as to the number of TLB entries that can be individually flushed and repopulated in that same amount of time. The threshold value is set based on (e.g., equal to) the number of TLB entries that can be individually flushed and repopulated in that amount of time.

20 Claims, 5 Drawing Sheets

DYNAMICALLY DETERMINING A TRANSLATION LOOKASIDE BUFFER FLUSH PROMOTION THRESHOLD VALUE

BACKGROUND

Many computer processors support virtual memory, which is a mechanism that allows different programs to share physical memory. A memory manager assigns a virtual memory space to each program and each program operates with reference to its assigned virtual memory space. The memory manager controls translating memory addresses in the virtual memory space to memory addresses in the shared physical memory. One component used by the memory manager is a translation lookaside buffer, which caches memory address translations. Situations can arise in which at least a portion of the translation lookaside buffer is to be flushed. However, it can be difficult to determine whether the entire translation lookaside buffer is to be flushed or only particular entries of the translation lookaside buffer are to be flushed, which can result in reduced performance of the processor.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an amount of time to flush and repopulate all entries of a translation lookaside buffer of a computing device is determined, the translation lookaside buffer caching virtual to physical memory address translations. A number of entries of the translation lookaside buffer that can be flushed and repopulated individually in that amount of time is also determined. A translation lookaside buffer flush promotion threshold value is set based on the number of translation lookaside buffer entries that can be individually flushed and repopulated in that amount of time.

BRIEF DESCRIPTION OF THE DRAWINGS

The same numbers are used throughout the drawings to reference like features.

DETAILED DESCRIPTION

Dynamically determining a translation lookaside buffer flush promotion threshold value is discussed herein. The translation lookaside buffer (TLB) is a cache of virtual to physical memory address translations. Situations can arise in which one or more entries of the TLB are to be removed from the TLB or otherwise invalidated, also referred to as flushing one or more entries. The TLB flush promotion threshold value indicates when all entries of the TLB are to be flushed rather than individual entries of the TLB. If the number of TLB entries to be flushed satisfies the TLB flush promotion threshold value (e.g., at least the threshold value number of entries are to be flushed) then all entries of the TLB are flushed. However, if the number of TLB entries to be flushed does not satisfy the TLB flush promotion threshold value (e.g., less than the threshold value number of entries are to be flushed) then just that number of TLB entries are flushed. This provides the benefits that excessive time is not consumed to flush individual entries where a flush entire (a command or request to flush all entries of the TLB) can be performed more quickly, and also that wasteful over-flushing (by issuing flush entires rather than individual flushes) does not occur as that would cause expensive downstream repopulation costs.

The TLB flush promotion threshold value for a computing device is determined dynamically, such as during booting of the computing device. The threshold value is determined by determining an amount of time it takes to flush and repopulate all entries of the TLB. A determination is then made as to the number of TLB entries that can be flushed and repopulated individually in that same amount of time. The threshold value is set based on (e.g., equal to) the number of TLB entries that can be individually flushed and repopulated in that amount of time.

The TLB flush promotion threshold value is thus determined dynamically for a particular computing device by that particular computing device. Different computing devices having different processors, memory architectures, memory controllers, executing within emulation like virtual machines, and so forth can all determine different threshold values. Because the threshold value is determined dynamically by the device, the threshold value reflects the actual performance characteristics of the device rather than expected or estimated performance characteristics of the device. Note also that the techniques discussed herein can remove undesirable variability of memory and cache subsystems by mapping the set of page translations to a single page—in this way, each repopulation will consistently occur from the processor's L1 cache rather than arbitrarily from memory, thus allowing the (very fast) pure TLB repopulation cost to be measured without the (much slower) memory costs skewing the results.

Figure 1:
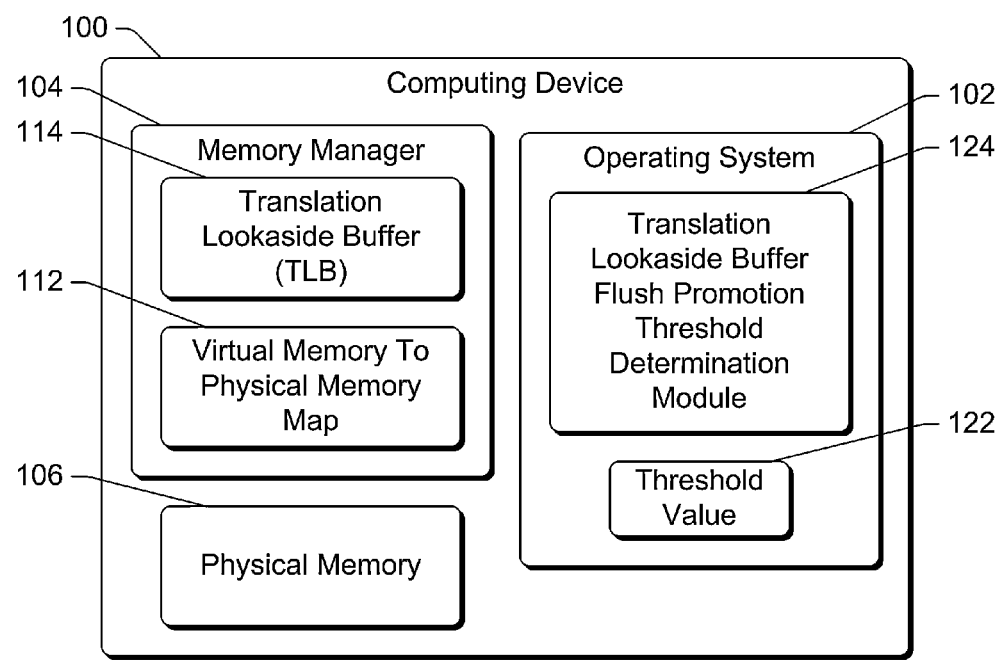
FIG. 1 is a block diagram illustrating an example computing device implementing the dynamically determining a translation lookaside buffer flush promotion threshold value in accordance with one or more embodiments.

FIG. 1 is a block diagram illustrating an example computing device 100 implementing the dynamically determining a translation lookaside buffer flush promotion threshold value in accordance with one or more embodiments. Computing device 100 can be a variety of different types of devices, such as a physical device or a virtual device. For example, computing device 100 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Computing device 100 can also be a virtual device, such as a virtual machine running on a physical device. A virtual machine can be run on any of a variety of different types of physical devices (e.g., any of the various types listed above). Thus, computing device 100 may range from a full resource device with substantial memory and processor resources (e.g., personal computers, game consoles) to a low-resource device with limited memory and/or processing resources (e.g., traditional set-top boxes, handheld game consoles).

Computing device 100 includes an operating system 102 and a memory manager 104. The operating system 102 manages various different components of the computing device 100, such as input components (e.g., keyboards, touchscreens, microphones), output components (e.g., displays, speakers), communication components (e.g., allowing communication with other devices via various wired or wireless connections), and so forth. The computing device 100 also includes a memory manager 104, which manages access to physical memory 106 of the computing device 100.

The memory manager 104 can be implemented in software, firmware, hardware, combinations thereof, and so forth. The memory manager 104 can be implemented in various manners. For example, the memory manager 104 can be implemented as part of a processor (e.g., central processing unit (CPU)) of the computing device 100, as part of a chipset of the computing device 100, as part of the operating system 102, combinations thereof, and so forth.

The memory manager 104 includes a virtual memory to physical memory map 112, and a TLB 114. The virtual memory to physical memory map 112 is a mapping of memory addresses in a virtual memory space to memory addresses in a physical memory space (e.g., memory addresses in the physical memory 106).

It should be noted that the physical memory 106 refers to memory that the memory manager 104 treats or views as physical memory. In one or more embodiments, the physical memory 106 is physical or hardware memory implemented as random access memory (RAM) of the computing device 100. Alternatively, in situations in which the computing device 100 is a virtual device, the physical memory 106 can be virtual memory that the memory manager 104 treats or views as physical memory (e.g., RAM).

Figure 2:
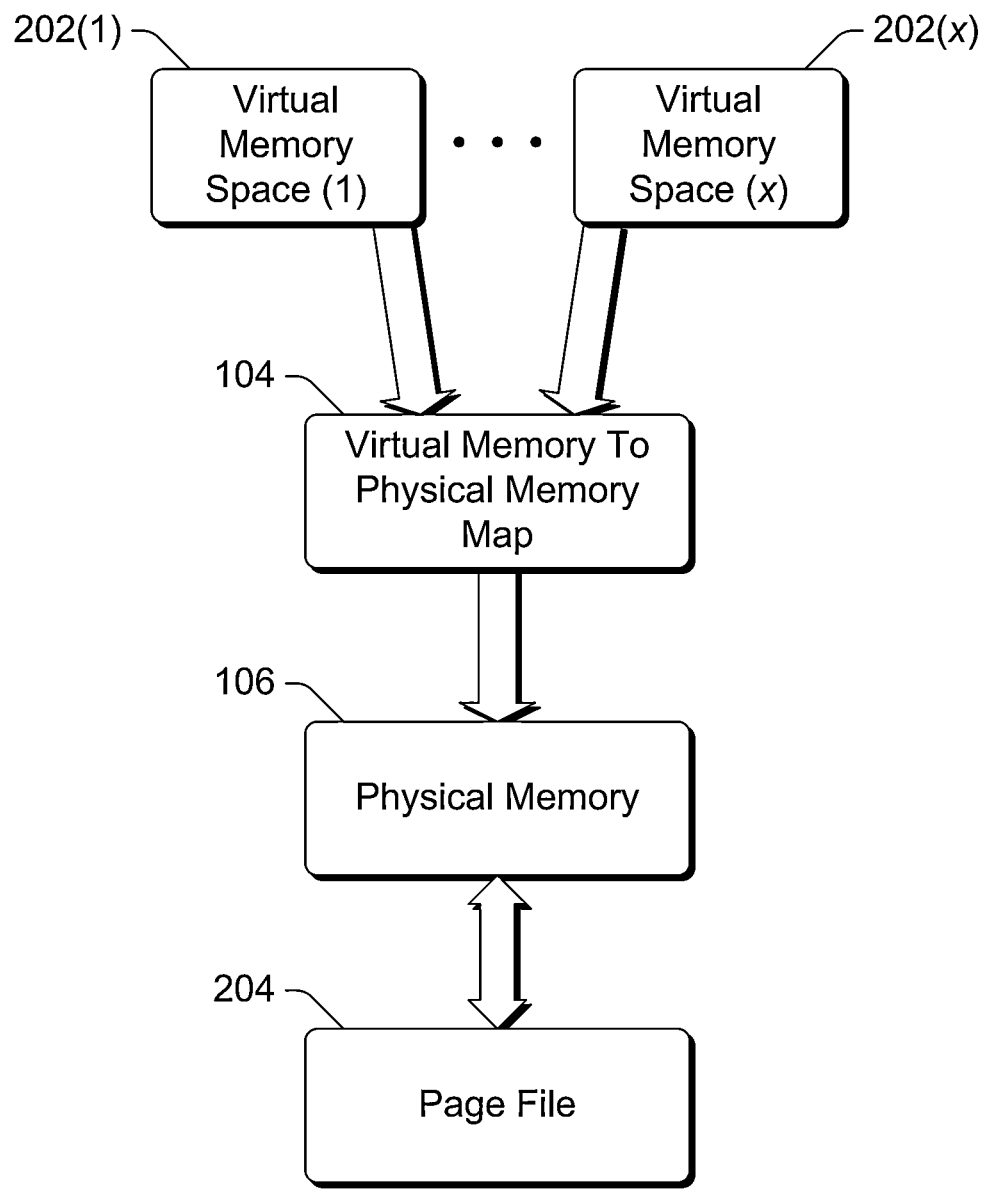
FIG. 2 illustrates an example of virtual memory spaces in accordance with one or more embodiments.

FIG. 2 illustrates an example of virtual memory spaces in accordance with one or more embodiments. Multiple (x) virtual memory spaces 202(1), . . . , 202(x) are illustrated in FIG. 2. Each virtual memory space 202 is one or more ranges of virtual memory addresses that are assigned (e.g., by the memory manager 104) to a program. The amount of virtual memory made available by the memory manager is larger than the size of physical memory 106, thus multiple different virtual memory addresses can be mapped to the same physical memory address in the physical memory 106. The memory manager 104 maintains a record of these mappings in the virtual memory to physical memory map 112 of FIG. 1.

The memory manager 104 also manages swapping data in and out of the physical memory 106 so that the correct data is stored in the physical memory 106 when accessing a particular virtual memory address. For example, one memory space 202 may include a virtual memory address R and the same (or different) memory space 202 may include a virtual memory address S, and both virtual memory address R and virtual memory address S may map to the same physical memory address T in the physical memory 106. The memory manager 104 manages swapping of data in and out of the physical memory 106 so that the correct data for virtual memory address R is in physical memory address T when virtual memory address R is accessed, and the correct data for virtual memory address S is in physical memory address T when virtual memory address S is accessed.

In one or more embodiments, the memory manager 104 makes use of paging to facilitate swapping data in and out of the physical memory 106. The memory manager 104 organizes both the virtual memory and physical memory into pages, which are a particular (e.g., fixed) size unit of data. The act of paging refers to reading data in units of pages from a backing file or page file 204 when the data is not in the physical memory 106, and writing dirty data back in units of pages into the backing file or page file 204. If a virtual memory address in a virtual memory space 202 is accessed and the data for the page that includes that virtual memory address is in the physical memory 106, then the virtual memory address is mapped to the appropriate physical memory address by the memory manager 104. However, if a virtual memory address in a virtual memory space 202 is accessed and the data for the page that includes that virtual memory address is not in the physical memory 106, then memory manager reads data for the page in to the physical memory 106 from a backing file or page file 204, and the virtual memory address is mapped to the appropriate physical memory address by the memory manager 104. Such paging techniques are well known to those skilled in the art.

Returning to FIG. 1, the memory manager 104 includes a TLB 114 that is a cache of virtual to physical memory address translations (also referred to as mappings). The TLB 114 caches the address translations so that some of the virtual to physical memory mappings can be determined more quickly than if the virtual memory to physical memory map 112 were searched for the translation. The TLB 114 is thus populated with data mapping virtual memory addresses to physical memory addresses.

In one or more embodiments, the TLB 114 includes multiple entries, each of which caches the mapping or translation of the virtual memory addresses for one page of virtual memory to the physical memory addresses for one page of the physical memory 106. Situations arise in which one or more entries of the TLB 114 are to be removed from the TLB 114 or otherwise invalidated in the TLB 114, also referred to as flushing the one or more entries. Such situations can arise in response to a variety of different events in the computing device, such as memory being allocated to and/or de-allocated from a program, protections on memory (e.g., read/write permissions) being changed and so forth. These different events indicate how many entries of the TLB 114 are to be flushed. For example, if memory de-allocated from a program is included in the pages of translations cached in five entries of the TLB 114, then the event indicates that those five TLB entries are flushed. By way of another example, if protections on memory included in the pages of translations cached in two entries of the TLB 114 are changed, then the event indicates that those two TLB entries are flushed.

Flushing of individual entries of the TLB 114 is supported by the computing device, as is flushing all entries of the TLB 114 (also referred to as flushing the entire TLB 114). Flushing individual entries and all entries can be supported in different manners, such as by the memory manager 104 implementing an instruction to flush a particular entry or range of entries of the TLB 114 individually, and an instruction to flush all entries of the TLB 114. For example, a processor of the computing device 100 that implements the memory manager 104 can implement two instructions: one instruction that when executed flushes a particular entry of the TLB 114 individually (the particular entry being identified as a parameter of the instruction), and a second instruction that when executed flushes all entries of the TLB 114.

Flushing an entry of the TLB 114 and subsequently repopulating the entry of the TLB 114 with new data takes a particular amount of time, and this amount of time can vary based on different characteristics of the computing device 100 such as the processor, memory architecture, memory controller, and so forth. It can be the case that the amount of time it takes to flush and repopulate a particular number of (but less than all) entries of the TLB 114 is greater than the amount of time it takes to flush and repopulate all entries of the TLB 114, especially since software does not always know the size or other characteristics of the TLB including which particular translations happen to be in the TLB at any time. For example, assume there are 64 entries in the TLB 114, and an event occurs that indicates 22 entries of the TLB 114 are to be flushed. Depending on the particular computing device, it may be the case that it would take more time (and thus reduce performance of the computing device 100) to flush and repopulate the 22 entries individually than it would be to flush and repopulate all 64 entries.

A TLB flush promotion threshold value 122 is maintained by the computing device 100 to facilitate determining whether the entries of the TLB 114 indicated by the event that occurred are to be flushed, or whether all entries of the TLB 114 are to be flushed. In the illustrated example the TLB flush promotion value 122 is maintained by the operating system 102, although alternatively the threshold value 122 can be maintained by other modules or components of the computing device 100.

The TLB flush promotion threshold value 122 indicates when all entries of the TLB 114 are to be flushed rather than individual entries of the TLB 114. If the number of entries of the TLB 114 to be flushed as indicated by the event that occurred does not satisfy the TLB flush promotion threshold value 122 (e.g., the number of entries is less than the threshold value 122), then the entries of the TLB 114 as indicated by the event that occurred are flushed. However, if the number of entries of the TLB 114 to be flushed as indicated by the event that occurred satisfies the TLB flush promotion threshold value 122 (e.g., the number of entries is equal to or greater than the threshold value 122), then all entries of the TLB 114 are flushed with a single instruction (rather than individually). Thus, if the number of entries of the TLB 114 to be flushed as indicated by the event that occurred satisfies the TLB flush promotion threshold value 122, the flushing of the TLB 114 is promoted or advanced from flushing just the entries indicated by the event to flushing all of the entries of the TLB 114.

A TLB flush promotion threshold determination module 124 determines the threshold value 122 for the computing device 100. In the illustrated example the TLB flush promotion threshold determination module 124 is included as part of the operating system 102, although alternatively the module 124 can be implemented by other modules or components of the computing device 100. The module 124 determines the threshold value 122 dynamically for computing device 100, taking into account the actual performance characteristics of the computing device 100 rather than expected or estimated performance characteristics of the computing device 100, as discussed in more detail below.

In one or more embodiments, the TLB flush promotion threshold determination module 124 determines the TLB flush promotion threshold value 122 during booting of the computing device 100. Booting the computing device refers to starting the computing device, such as from a system reset or from a power off state. The module 124 can determine the threshold value 122 each time the computing device 100 is booted, or alternatively at other intervals (e.g., once per day such as the first boot each day, once per week such as the first boot each week, etc.) or only once (e.g., the first time the computing device 100 is booted). The threshold value 122 determined by the module 124 can be saved (e.g., in nonvolatile memory of the computing device 100), and the saved value retrieved and used as the threshold value during boots when the module 124 does not determine the threshold value 122.

The TLB flush promotion threshold determination module 124 can alternatively determine the TLB flush promotion threshold value 122 at other times other than during booting of the computing device 100. For example, the module 124 can determine the threshold value 122 after the booting of the computing device 100 completes, such as during a time of low processor or memory usage of the computing device 100. A previously generated and saved threshold value (or default value configured in the computing device 100, such as in the operating system 102) can be used as the threshold value 122 until the determination module 124 determines the threshold value 122 using the techniques discussed herein.

Figure 3:
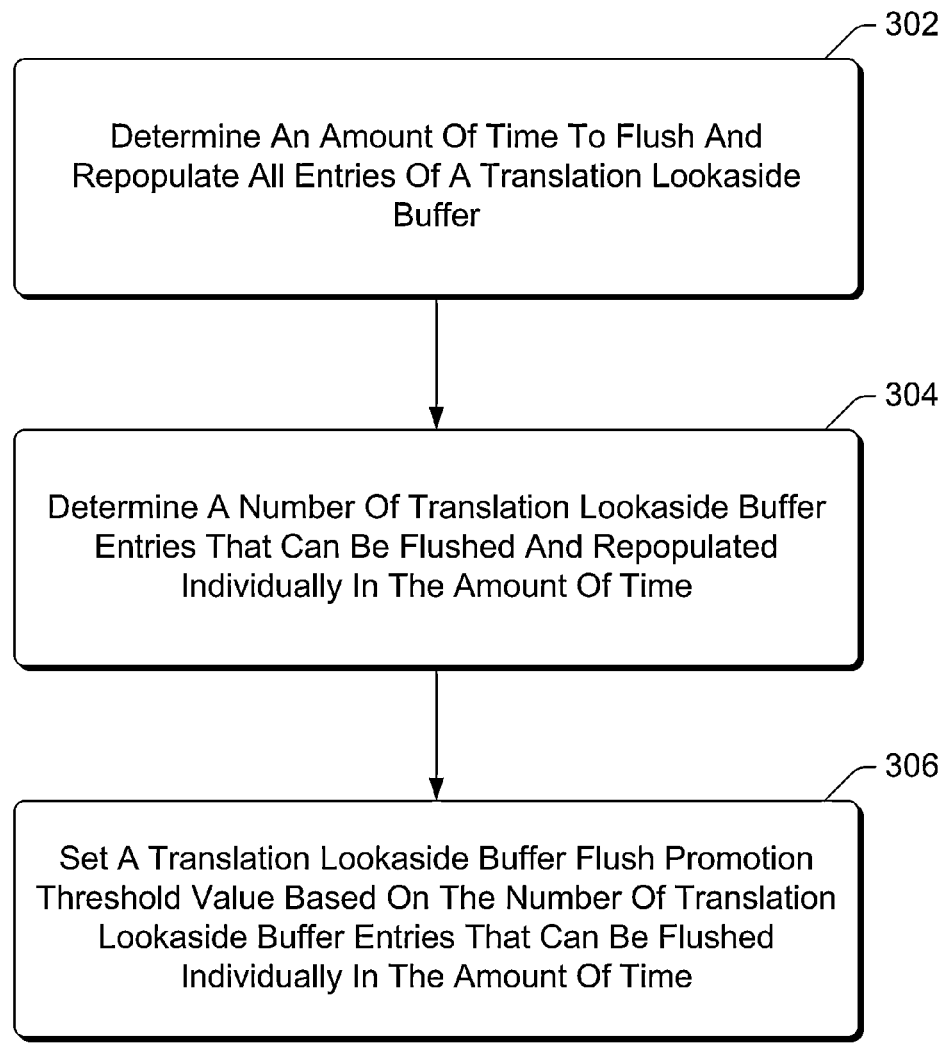
FIG. 3 is a flowchart illustrating an example process for dynamically determining a translation lookaside buffer flush promotion threshold value in accordance with one or more embodiments.

FIG. 3 is a flowchart illustrating an example process 300 for dynamically determining a translation lookaside buffer flush promotion threshold value in accordance with one or more embodiments. Process 300 is carried out by a TLB flush promotion threshold determination module of a computing device, such as module 124 of computing device 100 of FIG. 1, and can be implemented in software, firmware, hardware, or combinations thereof. Process 300 is shown as a set of acts and is not limited to the order shown for performing the operations of the various acts. Process 300 is an example process for dynamically determining a translation lookaside buffer flush promotion threshold value; additional discussions of dynamically determining a translation lookaside buffer flush promotion threshold value are included herein with reference to different figures.

In process 300, an amount of time to flush and repopulate all entries of the TLB is determined (act 302). The flushing and repopulating of all entries of the TLB refers to flushing the entire TLB using a particular command or request (e.g., using an instruction that when executed flushes all entries of the TLB). Thus, the flushing is done in response to a request that identifies all entries of the TLB, rather than multiple requests each identifying single TLB entries or ranges (that are less than all) of the TLB. The TLB is repopulated by performing reads from virtual addresses that result in each entry of the TLB being repopulated with data (e.g., a new translation is loaded into each entry of the TLB). In one or more embodiments, the TLB is repopulated by performing a number of reads from virtual addresses equal to the number of entries in the TLB. For example, a number of pages of virtual memory equal to or greater than the number of entries in the TLB can be mapped to the same page of physical memory, and a read from an address of each virtual memory page can be performed. The amount of time to flush and repopulate all entries of the TLB is measured and used as the determined amount of time in act 302.

A number of TLB entries that can be flushed and repopulated individually in the amount of time is also determined (act 304). The amount of time in act 304 can be more or less than the amount of time determined in act 302. The number of TLB entries determined in act 304 is a largest number of TLB entries that can be flushed and repopulated individually in the amount of time. Each TLB entry is repopulated by performing a read from a virtual address that results in the TLB entry being repopulated (e.g., a new translation is loaded into the TLB entry).

The TLB flush promotion threshold value is set based on the number of TLB entries that can be flushed individually along with the entire TLB being repopulated in the amount of time (act 306). In one or more embodiments, the TLB flush promotion threshold value is set to be equal to the number of TLB entries determined in act 304. Alternatively, the TLB flush promotion threshold value can be set to other values based on the number of entries determined in act 304, such as a threshold number (e.g., 1 or 5% of the number of entries in the TLB) greater than or less than the number of entries determined in act 304.

Figure 4:
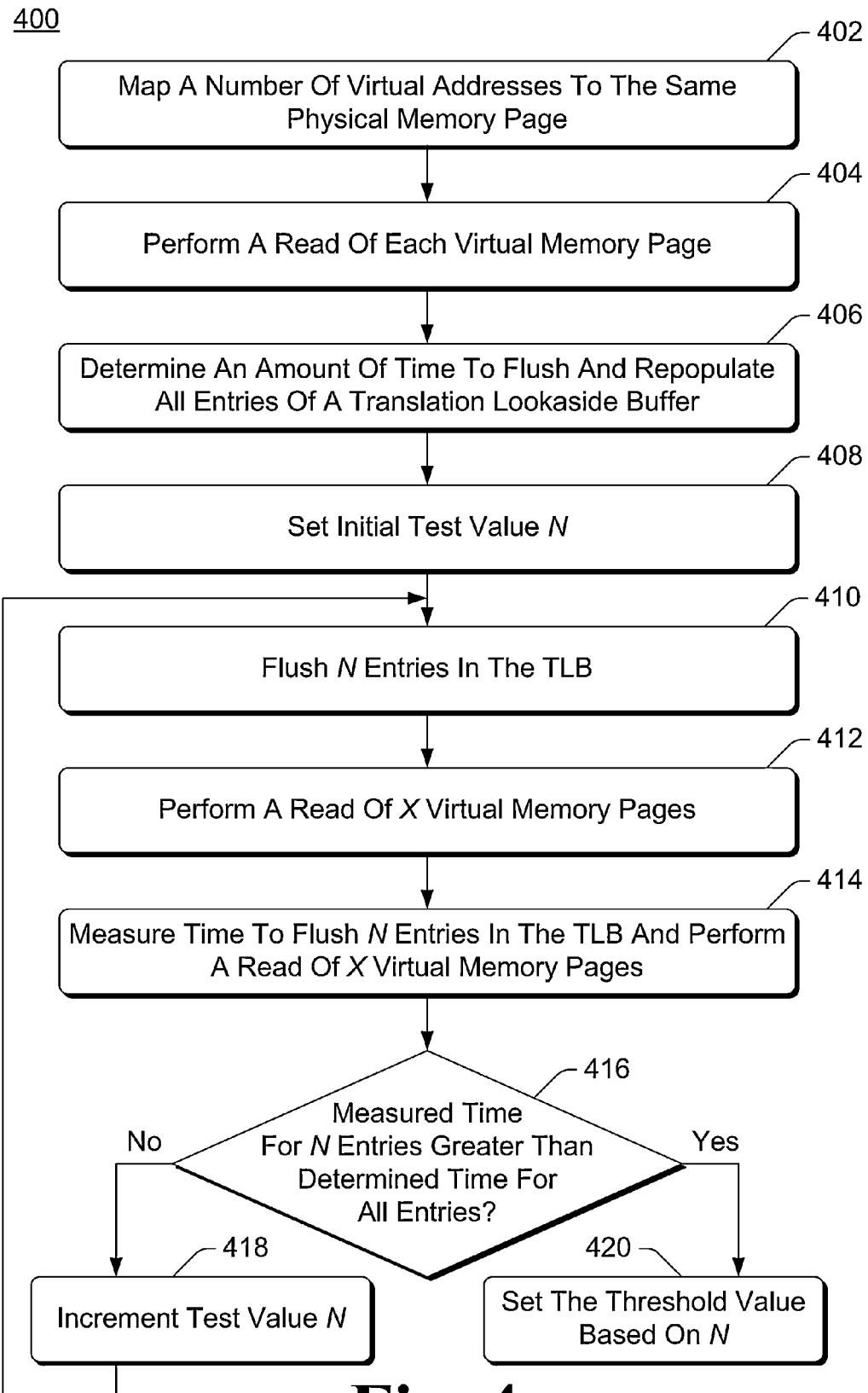
FIG. 4 is a flowchart illustrating another example process for dynamically determining a translation lookaside buffer flush promotion threshold value in accordance with one or more embodiments.

FIG. 4 is a flowchart illustrating another example process 400 for dynamically determining a translation lookaside buffer flush promotion threshold value in accordance with one or more embodiments. Process 400 is carried out by a TLB flush promotion threshold determination module of a computing device, such as module 124 of computing device 100 of FIG. 1, and can be implemented in software, firmware, hardware, or combinations thereof. Process 400 is an example of the process 300 of FIG. 3. Process 400 is shown as a set of acts and is not limited to the order shown for performing the operations of the various acts. Process 400 is an example process for dynamically determining a translation lookaside buffer flush promotion threshold value; additional discussions of dynamically determining a translation lookaside buffer flush promotion threshold value are included herein with reference to different figures.

In process 400, a number of virtual addresses are mapped to the same physical memory page (act 402). The number of virtual addresses in act 402 is a number intended to be typically larger than (or at least equal to) the number of entries in the TLB. The exact number of entries in the TLB may not be known, in which case the number in act 402 is a number that is larger than the number of entries that are expected to be (but in some situations may not be) in the TLB (e.g., based on knowledge of TLBs used in various devices). In one or more embodiments, the number of virtual addresses in act 402 is 2048, although 2048 is an example and other values can alternatively be used. For some situations, such as virtual machine environments that emulate a TLB, the virtual TLB size can be much larger (and optionally variable) compared to the number in act 402, but the number in act 402 is still satisfactory for the purposes of process 400. Additional virtual addresses can also be mapped to the same physical memory page (e.g., a memory page may be 4 kilobytes, and virtual addresses from 2048 virtual memory pages may be mapped to the same physical memory page, resulting in 8 megabytes of virtual addresses being mapped to the same physical memory page).

In one or more embodiments, the virtual addresses are mapped to the same physical memory page in act 402 to reduce the amount of memory traffic (e.g., since the same memory cache line is accessed in process 400). Alternatively, the virtual addresses could be mapped to a different number of physical memory pages (e.g., 2, 3, or some other number of physical memory pages), although this can introduce variability to the results since the (much more expensive) cache and memory accesses would be included in the measured times.

The mapped virtual addresses in act 402 are included as part of multiple different virtual memory pages (e.g., a number of virtual memory pages equal to the number in act 402, such as 2048). A read of a virtual address from each of these virtual memory pages is performed (act 404). By performing the reads in act 404, each entry of the TLB will be populated with data that is a mapping from the virtual memory page to the physical memory page. In one or more embodiments each read in act 404 is a read of one byte, although more bytes of data could alternatively be read. By reading only one byte, the number of different memory cache lines that are accessed (and cached) to perform the read is reduced, avoiding the memory caching interfering with the timing measurements discussed herein.

An amount of time to flush and repopulate all entries of the TLB is determined (act 406). Act 406 is, for example, act 302 of FIG. 3. The flushing and repopulating of all entries of the TLB refers to flushing the entire TLB using a particular command or request (e.g., using an instruction that when executed flushes all entries of the TLB), as discussed above. The TLB is repopulated by performing a read of a virtual address from each virtual memory page, analogous to act 404.

In one or more embodiments, the amount of time to flush and repopulate all entries of the TLB is determined measuring the amount of time taken to flush and repopulate all entries of the TLB multiple times, and then combining the amount of time measured for each of those multiple times. The amounts of time can be combined in different manners, such as being averaged together, being averaged together using a weighted averaging, being added together (if the flushing and repopulating of acts 410 and 412 discussed below is repeated the same number of times, and the measured times in act 414 discussed below are also added together), and so forth.

An initial test value, referred to as N, is set (act 408). The initial test value can be pre-configured in the computing device implementing the process 400 (e.g., in an operating system of the computing device), or alternatively obtained from another component, module, or device. The initial test value N is selected so that the time taken to flush and repopulate N entries in the TLB is expected to be (e.g., has at least a threshold probability or likelihood of being) less than the amount of time to flush and repopulate all entries of the TLB as determined in act 406. In one or more embodiments, the initial test value N is 1. Alternatively, other values can be used, such as a value of 2 or 3, a value that is relative to the number of entries in the TLB (e.g., 5% of the number of entries in the TLB), and so forth.

Given the test value N, N entries of the TLB are flushed (act 410). The N entries are flushed individually in act 410 using multiple requests each identifying one TLB entry to flush (e.g., using an instruction that when executed flushes a single entry of the TLB). Alternatively, the entries can be flushed in act 410 using a request identifying a range of TLB entries such as the first N entries (e.g., using an instruction that when executed flushes a particular range of entries of the TLB). In one or more embodiments, the N entries that are flushed in act 410 are the first N entries of the TLB (e.g., entries 0 through N−1), although other entries of the TLB can alternatively be flushed in act 410.

A read of each of X virtual memory pages is performed (act 412), which repopulates the N flushed entries with new data (as well as any amount of X>N, with the underlying hardware implementation being free to recycle entries, etc.). The mapped virtual addresses in act 402 are included as part of multiple different virtual memory pages (the number of different virtual memory pages being the value X), and a read of a virtual address from each of these virtual memory pages is performed, analogous to act 404 (the entire amount is read in order to accurately measure repopulation costs).

An amount of time to flush the N entries of the TLB and perform a read of the X virtual memory pages is determined (act 414). This amount of time is the amount of time to flush the N entries in act 410 and ensure all X entries exist (at one time or another) in the TLB.

In one or more embodiments, the amount of time to flush N entries of the TLB and perform a read of the X virtual memory pages is determined by measuring the amount of time taken to flush N entries of the TLB and perform a read of the X virtual memory pages multiple times, and then combining the amount of time measured for each of those multiple times. Thus, acts 410-414 are repeated multiple times, and the measured amount of times from each of these multiple times are combined to generate the measured amount of time to flush N entries of the TLB and perform a read of the X virtual memory pages. The amounts of time can be combined in different manners, such as being averaged together, being averaged together using a weighted averaging, being added together (if the amount of time to flush and repopulate all entries of the TLB is determined by flushing and repopulating all entries of the TLB the same number of times, and the amounts of time measured for each of those multiple times are also added together), and so forth.

A check is then made as to whether the measured time to flush N entries of the TLB and perform a read of the X virtual memory pages as determined in act 414 is greater than (or alternatively greater than or equal to) the amount of time to flush and repopulate all entries of the TLB as determined in act 406 (act 416). If the measured time to flush N entries of the TLB and perform a read of the X virtual memory pages as determined in act 414 is not greater than (or alternatively greater than or equal to) the amount of time to flush and repopulate all entries of the TLB as determined in act 406, then the test value N is incremented (act 418). The test value N can be incremented by 1, or alternatively by other amounts such as a value of 2 or 3, an amount that is relative to the number of entries in the TLB (e.g., 1% of the number of entries in the TLB), and so forth. Process 400 then returns to act 410, to flush and repopulate entries of the TLB given the new test value N.

However, if the measured time to flush N entries of the TLB and perform a read of the X virtual memory pages as determined in act 414 is greater than (or alternatively greater than or equal to) the amount of time to flush and repopulate all entries of the TLB as determined in act 406, then the TLB flush promotion threshold value is set based on the test value N (act 420). In one or more embodiments, the TLB flush promotion threshold value is set equal to N. Alternatively, the TLB flush promotion threshold value can be set to other values based on N, such as N plus some amount (e.g., 1 or 2, or an amount that is relative to the number of entries in the TLB such as 0.5% of the number of entries in the TLB), N minus some amount (e.g., 1 or 2, or an amount that is relative to the number of entries in the TLB such as 0.5% of the number of entries in the TLB), the value N rounded to the closest odd or even value, and so forth.

Thus, as can be seen in the process 400, the amount of time to flush different numbers of entries in the TLB and repopulate the TLB are determined. The number of entries increases until the amount of time taken to flush the number of entries and repopulate the TLB exceeds the amount of time taken to flush all entries in the TLB and repopulate the TLB. Alternatively, the process 400 can continue to increment the test value N a number of additional times (e.g., 3 or 4 times, or alternatively more times) to verify that the measured time to flush the test value N number of entries and repopulate the TLB was not an anomaly. For example, the process 400 can continue through acts 410-418, incrementing N until the time measured in act 414 is greater than the amount of time determined in act 406 for at least a particular number of (e.g., 3 or 4) consecutive values of N. The threshold value can then be set in act 420 based on the first (or alternatively other) of the consecutive values of N for which the time measure in act 414 was not greater than the amount of time determined in act 406.

Alternatively, rather than incrementing the test value N until the amount of time taken to flush the number of entries and repopulate the TLB exceeds the amount of time taken to flush all entries in the TLB and repopulate the TLB, the test value N can be incremented until a particular value of N is reached (e.g., the number of virtual addresses mapped in act 402). The measured time to flush N entries and repopulate the TLB for each value of N can be maintained in act 414, and these measured times evaluated after the particular value of N is reached. When evaluating these measured times, the value of N for which the measured time to flush the N entries and repopulate the TLB is greater than the determined timed to flush all entries in the TLB and repopulate the TLB is the value of N on which setting of the threshold value is based.

The process 400 is discussed with reference to starting with an initial test value N selected so that the time taken to flush N entries in the TLB and repopulate the TLB is expected to be (e.g., has at least a threshold probability or likelihood of being) less than the amount of time to flush all entries of the TLB and repopulate the TLB, and then incrementing the test value N until the amount of time taken to flush N entries and repopulate the TLB exceeds the amount of time taken to flush all entries in the TLB and repopulate the TLB. Alternatively, the process 400 can be performed in an analogous but opposite manner. For example, the process 400 can start with an initial test value N selected so that the time taken to flush N entries in the TLB and repopulate the TLB is expected to be (e.g., has at least a threshold probability or likelihood of being) greater than the amount of time to flush all entries of the TLB and repopulate the TLB, and then decrementing the test value N until the amount of time taken to flush N and repopulate the TLB entries no longer exceeds the amount of time taken to flush all entries in the TLB and repopulate the TLB.

Alternatively, various combinations of incrementing and decrementing the test value N can be used in conjunction with various search techniques to increase the speed with which the number of TLB entries that can be flushed and the TLB repopulated in the same amount of time (or within a threshold amount of time) as all entries of the TLB and the TLB repopulated. For example, the process 400 may begin with an initial test value N of 1, increment the test value by a first amount (e.g., 100) until the amount of time taken to flush N entries and repopulate the TLB exceeds the amount of time taken to flush all entries in the TLB and repopulate the TLB, then decrement the test value by a second amount (e.g., 1) until the amount of time taken to flush N entries and repopulate the TLB no longer exceeds the amount of time taken to flush all entries in the TLB and repopulate the TLB. The threshold value can then be set based on the value N when the amount of time taken to flush N entries and repopulate the TLB no longer exceeds the amount of time taken to flush all entries in the TLB and repopulate the TLB.

It should be noted that, in the discussions herein, reference is made to the number of entries in the TLB not being known. However, situations can arise in which the number of entries in the TLB is known, and the techniques discussed herein adjusted to reflect this knowledge. For example, the number of virtual addresses that are mapped to the same physical memory page in act 402 of FIG. 4 can be equal to (or greater than) the number of entries in the TLB. By way of another example, the value of X in acts 412 and 414 of FIG. 4 can be set equal to N (because the number of entries in the TLB is known, additional time need not be expended in act 404 or act 412 to read from more than a number of virtual memory pages equal to the number of entries in the TLB). E.g., if the first N entries of the TLB are flushed in act 410, then a read can be performed in act 412 from each of the first N virtual memory pages (that were mapped to the physical memory page in act 402).

Returning to FIG. 1, in one or more embodiments the computing device 100 includes both a data TLB and an instruction TLB. The techniques discussed herein refer to flushing and repopulating the data TLB, and the TLB flush promotion threshold value determined as discussed herein is used as the TLB flush promotion threshold value for both the data TLB and the instruction TLB. Alternatively, the techniques discussed herein can be performed analogously to flush and repopulate the instruction TLB, and separate TLB flush promotion threshold values generated for the data TLB and the instruction TLB (or the TLB flush promotion threshold value generated for the instruction TLB used for the data TLB).

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
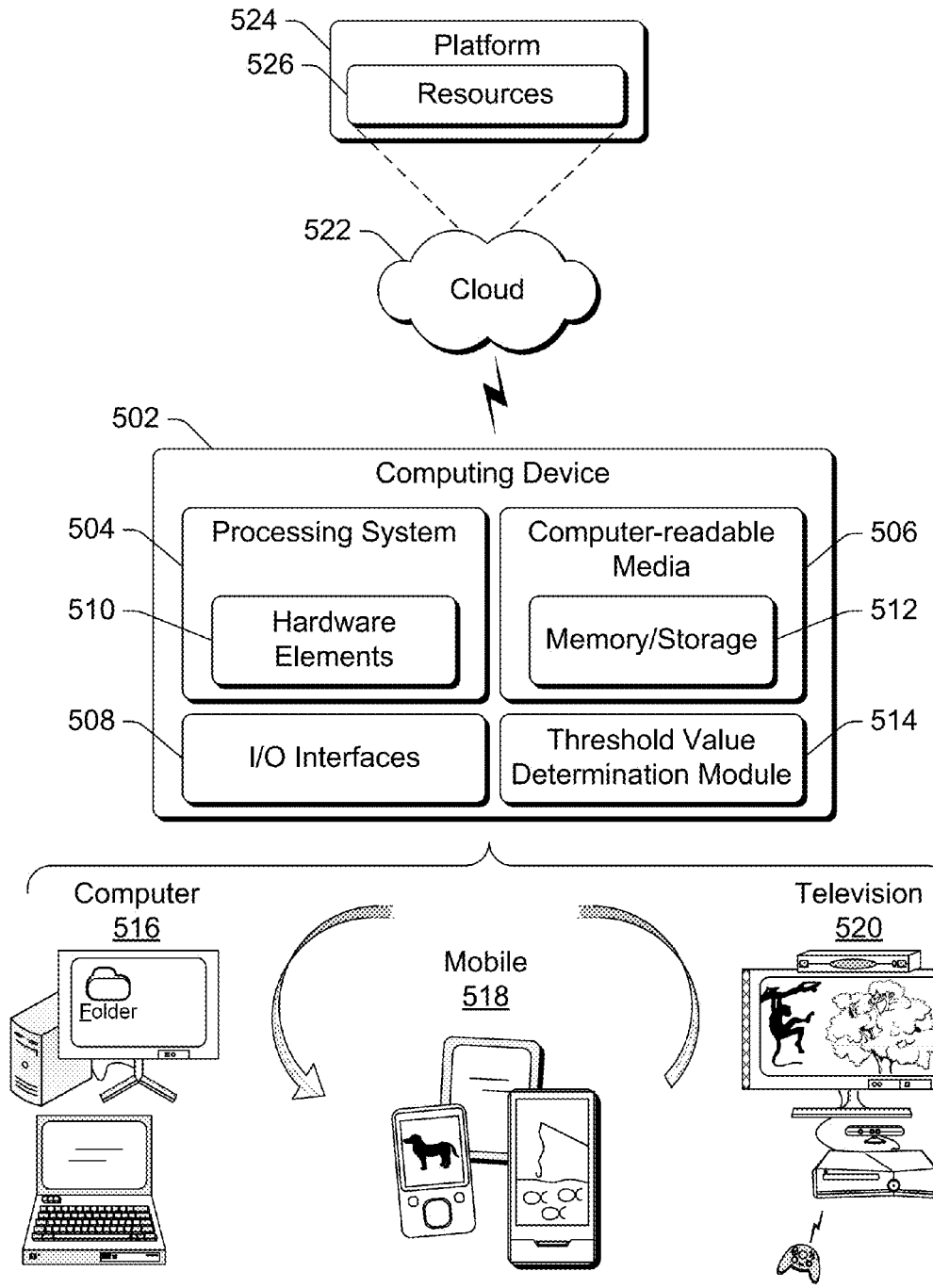
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Computing device 502 also includes a threshold value determination module 514. The threshold value determination module 514 dynamically determines a TLB flush promotion threshold value for the computing device 502, as discussed above. The threshold value determination module 514 can be, for example, the TLB flush promotion threshold determination module 124 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
   determining, by the computing device, an amount of time to flush and repopulate all entries of a translation lookaside buffer of the computing device, the translation lookaside buffer caching virtual to physical memory address translations;

determining, by the computing device, a number of entries of the translation lookaside buffer that can be individually flushed and repopulated in the amount of time; and setting, by the computing device, a translation lookaside buffer flush promotion threshold value based on the number of translation lookaside buffer entries that can be individually flushed and repopulated in the amount of time.

2. A method as recited in claim 1, the translation lookaside buffer flush promotion threshold value indicating when all entries of the translation lookaside buffer are to be flushed rather than individual entries of the translation lookaside buffer.

3. A method as recited in claim 1, further comprising performing the determining the amount of time to flush and repopulate all entries of the translation lookaside buffer, the determining the number of entries of the translation lookaside buffer that can be flushed and repopulated individually in the amount of time, and the setting the translation lookaside buffer flush promotion threshold value during each booting of the computing device.

4. A method as recited in claim 1, the determining an amount of time to flush and repopulate all entries of the translation lookaside buffer comprising determining an amount of time to flush all entries of the translation lookaside buffer as well as perform reads that result in each entry of the translation lookaside buffer being repopulated with data.

5. A method as recited in claim 1, the determining a number of entries of the translation lookaside buffer that can be individually flushed and repopulated in the amount of time comprising flushing a test value number of entries of the translation lookaside buffer and performing reads of virtual memory addresses that are mapped to physical memory by the flushed entries of the translation lookaside buffer.

6. A method as recited in claim 5, further comprising repeating the flushing the test value number of entries of the translation lookaside buffer and performing reads of virtual memory addresses that are mapped to physical memory by the flushed entries of the translation lookaside buffer one or more times with an incremented test value in each of the one or more times.

7. A method as recited in claim 6, the incremented tested value comprising the test value incremented by one in each of the one or more times.

8. A method as recited in claim 6, further comprising repeating the flushing the test value number of entries of the translation lookaside buffer and performing reads of virtual memory addresses that are mapped to physical memory by the flushed entries of the translation lookaside buffer until an amount of time to flush the test value number of entries of the translation lookaside buffer and repopulate the translation lookaside buffer is greater than the amount of time to flush all entries of the translation lookaside buffer and repopulate the translation lookaside buffer, and the setting comprising setting the translation lookaside buffer promotion threshold value as the test value number of entries when the amount of time to flush the test value number of entries of the translation lookaside buffer and repopulate the translation lookaside buffer is greater than the amount of time to flush all entries of the translation lookaside buffer and repopulate the translation lookaside buffer.

9. A method as recited in claim 1, the determining an amount of time to flush and repopulate all entries of a translation lookaside buffer comprising:

flushing and repopulating all entries of the translation lookaside buffer multiple times;

measuring, for each of the multiple times, the amount of time to flush and repopulate all entries of the translation lookaside buffer; and determining the amount of time to flush and repopulate all entries of the translation lookaside buffer by combining the measured amounts of time to flush and repopulate all entries of the translation lookaside buffer.

10. A method as recited in claim 1, further comprising saving the translation lookaside buffer flush promotion threshold value for use as the translation lookaside buffer flush promotion threshold value in one or more subsequent boots of the computing device.

11. A computing device comprising:

one or more processors; and one or more computer-readable media having stored thereon multiple instructions that, responsive to execution by the one or more processors, cause the one or more processors to perform acts comprising:

determining an amount of time to flush and repopulate all entries of a translation lookaside buffer (TLB) of the computing device, the TLB caching virtual to physical memory address translations;

setting an initial value for a test value;

flushing a number of entries of the TLB equal to the test value;

repopulating the TLB;

repeating the setting, flushing, and repopulating one or more times with incremented test values; and setting a TLB flush promotion threshold value based on the test value at a time when the amount of time to flush the test value number of entries of the TLB and repopulate the TLB is greater than the amount of time to flush and repopulate all entries of the TLB.

12. A computing device as recited in claim 11, the TLB flush promotion threshold value indicating when all entries of the translation lookaside buffer are to be flushed rather than individual entries of the translation lookaside buffer.

13. A computing device as recited in claim 11, the multiple instructions further causing the one or more processors to perform the acts during each booting of the computing device.

14. A computing device as recited in claim 11, the initial value for the test value comprising a value of 1.

15. A computing device as recited in claim 11, each incremented test value comprising incrementing the previous test value by 1.

16. A computing device as recited in claim 11, the determining an amount of time to flush and repopulate all entries of a TLB comprising:

flushing and repopulating all entries of the TLB multiple times;

measuring, for each of the multiple times, the amount of time to flush and repopulate all entries of the TLB; and determining the amount of time to flush and repopulate all entries of the TLB by combining the measured amounts of time to flush and repopulate all entries of the TLB.

17. A computing device as recited in claim 11, the acts further comprising determining an amount of time to flush a number of entries of the TLB equal to the test value and repopulate the TLB by:

flushing a test value number of entries of the TLB and repopulating the TLB multiple times;

measuring, for each of the multiple times, the amount of time to flush the test value number of entries of the TLB and repopulate the TLB; and determining the amount of time to flush the test value number of entries of the TLB and repopulate the TLB by combining the measured amounts of time to flush the test value number of entries of the TLB and repopulate the TLB.

18. A computing device as recited in claim 11, the acts further comprising mapping to a same physical memory page, prior to determining an amount of time to flush and repopulate all entries of a TLB, virtual addresses in a number of virtual memory pages that is greater than the number of entries in the TLB.

19. A computing device as recited in claim 11, further comprising:
repeating the flushing and the repopulating one or more times with incremented test values after the amount of time to flush the test value number of entries of the TLB was greater than the amount of time to flush and repopulate all entries of the TLB until the amount of time to flush the test value number of entries of the TLB and repopulate the TLB is greater than the amount of time to flush and repopulate all entries of the TLB for at least a threshold number of test values; and
setting the TLB flush promotion threshold value based on the test values in the threshold number of test values.

20. A computing device comprising:
one or more processors;
a translation lookaside buffer configured to cache virtual to physical memory address translations; and
a promotion threshold determination module stored in one or more computer-readable media and configured to, responsive to execution by the one or more processors:
determine an amount of time to flush and repopulate all entries of the translation lookaside buffer,
determine a number of entries of the translation lookaside buffer that can be individually flushed and repopulated in the amount of time, and
set a translation lookaside buffer flush promotion threshold value based on the number of translation lookaside buffer entries that can be individually flushed and repopulated in the amount of time.

* * * * *